United States Patent
Hsiao et al.

(10) Patent No.: US 8,291,137 B2
(45) Date of Patent: Oct. 16, 2012

(54) METHOD AND SYSTEM FOR A UNIVERSAL SERIAL BUS IMAGE CAPTURING WITH TWO ISOCHRONOUS TRANSFERS

(75) Inventors: Kuang Ting Hsiao, Hsinchu (TW); Ji-Jeng Deng, Hsinchu (TW); Chien-Chung Lin, Toufen Township, Miaoli County (TW)

(73) Assignee: Sunplus Innovation Technology Inc., Hsinchu (TW)

( * ) Notice: Subject to any disclaimer, the term of this patent is extended or adjusted under 35 U.S.C. 154(b) by 0 days.

(21) Appl. No.: 13/064,739

(22) Filed: Apr. 13, 2011

(65) Prior Publication Data

US 2011/0271016 A1    Nov. 3, 2011

Related U.S. Application Data

(60) Provisional application No. 61/282,948, filed on Apr. 28, 2010.

(30) Foreign Application Priority Data

May 25, 2010  (TW) ................................ 99116667 A (51) Int. Cl.
*G06F 3/00* (2006.01)
*G06F 15/16* (2006.01)
*G06F 13/00* (2006.01)

(52) U.S. Cl. ............. 710/52; 710/62; 709/234; 711/118
(58) Field of Classification Search .................. None
See application file for complete search history.

(56) References Cited

U.S. PATENT DOCUMENTS

| | | | | |
|---|---|---|---|---|
| 5,987,530 A * | 11/1999 | Thomson | .......................... | 710/4 |
| 5,996,031 A * | 11/1999 | Lim et al. | ......................... | 710/52 |
| 6,704,310 B1 * | 3/2004 | Zimmermann et al. | ...... | 370/389 |
| 2007/0188506 A1 * | 8/2007 | Hollevoet et al. | ............. | 345/530 |
| 2007/0201811 A1 * | 8/2007 | Bruls | .............................. | 386/46 |
| 2009/0102969 A1 * | 4/2009 | Knutson et al. | ............... | 348/471 |

\* cited by examiner

*Primary Examiner* — Henry Tsai
*Assistant Examiner* — Michael Sun
(74) *Attorney, Agent, or Firm* — Bacon & Thomas, PLLC (57) ABSTRACT

A system for universal serial bus (USB) image capturing with two isochronous transfers includes a USB image capturing device and a host. The USB image capturing device has two endpoints for transferring a video stream through a USB. The host has a driver for receiving the video stream through the USB. The driver receives the video stream, and creates a read extension data structure for the endpoints. The driver manages and dispatches the packets of the endpoints, and copies data of the packets into a first buffer and a second buffer, respectively. When a first end frame flag in a packet of the first endpoint is set and a second end frame flag in a packet of the second endpoint is set, the driver combines data of the first and the second buffers into a frame and sends the frame to the host.

12 Claims, 8 Drawing Sheets

| Packet | Dir | H | SOF | Frame# | CRC5 | Pkt Len | Time | Time Stamp |
|---|---|---|---|---|---|---|---|---|
| 122238 | → | S | 0xA5 | 1293.5 | 0x14 | 12 | 500.000ns | 00011.0423 4912 |

| Tarnsation | H | IN | ADDR | ENDP | T | Data | Time | Time Stamp |
|---|---|---|---|---|---|---|---|---|
| 20876 | S | 0x96 | 1 | 1 | 2 | 960 bytes | 17.433 μs | 00011.0423 4942 |
| 20877 | S | 0x96 | 1 | 1 | 1 | 960 bytes | 17.433 μs | 00011.0423 5988 |
| 20878 | S | 0x96 | 1 | 1 | 0 | 960 bytes | 89.600 μs | 00011.0423 7034 |

125 μs

| Packet | Dir | H | SOF | Frame# | CRC5 | Pkt Len | Time | Time Stamp |
|---|---|---|---|---|---|---|---|---|
| 122245 | → | S | 0xA5 | 1293.6 | 0x14 | 12 | 500.000ns | 00011.0424 4910 |

| Tarnsation | H | IN | ADDR | ENDP | T | Data | Time | Time Stamp |
|---|---|---|---|---|---|---|---|---|
| 20879 | S | 0x96 | 1 | 1 | 1 | 960 bytes | 17.400 μs | 00011.0424 4940 |
| 20880 | S | 0x96 | 1 | 1 | 0 | 960 bytes | 107.067 μs | 00011.0424 5984 |

125 μs

| Packet | Dir | H | SOF | Frame# | CRC5 | Pkt Len | Time | Time Stamp |
|---|---|---|---|---|---|---|---|---|
| 122250 | → | S | 0xA5 | 1293.7 | 0x14 | 14 | 500.000ns | 00011.0425 4908 |

| Tarnsation | H | IN | ADDR | ENDP | T | Data | Time | Time Stamp |
|---|---|---|---|---|---|---|---|---|
| 20881 | S | 0x96 | 1 | 1 | 2 | 960 bytes | 17.500 μs | 00011.0425 4938 |
| 20882 | S | 0x96 | 1 | 1 | 1 | 960 bytes | 17.433 μs | 00011.0425 5988 |
| 20883 | S | 0x96 | 1 | 1 | 0 | 960 bytes | 89.533 μs | 00011.0425 7034 |

```
typedef struct   _USBCAMD_READ_EXTENSION {
    ULONG Sig;
    LIST_ENTRY ListEntry;
    PIRP Irp;
    PVOID Srb;
    ULONG NumberOfPackets;
    PUCHAR RawFrameBuffer;
    ULONG RawFrameLength;
    ULONG ActualRawFrameLen;
    ULONG ActualRawFrameLength;
    ULONG RawFrameOffset;

/////////////////Dual ISO///////////////
    PUSBCAMD_DUALISO_EXTENSION pIso1_header;
    PUSBCAMD_DUALISO_EXTENSION pIso2_header;
    PUCHAR pISO1;
    PUCHAR pISO2;
    ULONG ISO1_Start;
    ULONG ISO2_Start;
    ULONG ISO1_Start_Next;
    ULONG ISO2_Start_Next;
    ULONG ISO1_End;
    ULONG ISO2_End;
    ULONG ISO1_Current;
    ULONG ISO2_Current;
    BOOLEAN ISO1IsReady;
    BOOLEAN ISO2IsReady;

BOOLEAN DropFrame;    // when set, drop the current frame and recycle read SRB.
    PUCHAR MinDriverExtension[0];
} USBCAMD_READ_EXTENSION, *PUSBCAMD_READ_EXTENSION;
```

FIG. 5

```
typedef struct _USBCAMD_DUALISO_EXTENSION {
    WORD PacketID;      // Packet ID, it will be a continue number from 1 to N
    PUCHAR BufferStart; // Record ISO1_Buffer, ISO2_Buffer address offset
    WORD PacketLength;  // The packet data length
} USBCAMD_DUALISO_EXTENSION, *PUSBCAMD_DUALISO_EXTENSION;
```

FIG. 6

```
NTSTATUS USBCAMD_ReadChannel
(
    IN PUSBCAMD_DEVICE_EXTENSION DeviceExtension,
    IN PUSBCAMD_CHANNEL_EXTENSION ChannelExtension,
    IN PUSBCAMD_READ_EXTENSION ReadExtension
);
```

| Packet | Dir | H | SOF | Frame# | CRC5 | Pkt Len | Time | Time Stamp |
|---|---|---|---|---|---|---|---|---|
| 10 | → | S | 0xA5 | 1972.? | 0x14 | 12 | 533.330ns | 00006.4593 7097 |

125μs {

| Tarnsation | H | IN | ADDR | ENDP | T | Data | Time | Time Stamp |
|---|---|---|---|---|---|---|---|---|
| 5 | S | 0x96 | 1 | 1 | 2 | 960 bytes | 17.533μs | 00006.4593 7129 |
| Tarnsation | H | IN | ADDR | ENDP | T | Data | Time | Time Stamp |
| 6 | S | 0x96 | 1 | 1 | 1 | 960 bytes | 17.333μs | 00006.4594 0681 |
| Tarnsation | H | IN | ADDR | ENDP | T | Data | Time | Time Stamp |
| 7 | S | 0x96 | 1 | 1 | 0 | 960 bytes | 17.433μs | 00006.4594 1721 |
| Tarnsation | H | IN | ADDR | ENDP | T | Data | Time | Time Stamp |
| 8 | S | 0x96 | 1 | 2 | 2 | 960 bytes | 17.233μs | 00006.4594 2767 |
| Tarnsation | H | IN | ADDR | ENDP | T | Data | Time | Time Stamp |
| 9 | S | 0x96 | 1 | 2 | 1 | 960 bytes | 17.433μs | 00006.4594 3801 |
| Tarnsation | H | IN | ADDR | ENDP | T | Data | Time | Time Stamp |
| 10 | S | 0x96 | 1 | 2 | 0 | 960 bytes | 37.500μs | 00006.4594 4847 |

| Packet | Dir | H | SOF | Frame# | CRC5 | Pkt Len | Time | Time Stamp |
|---|---|---|---|---|---|---|---|---|
| 23 | → | S | 0xA5 | 1972.? | 0x14 | 14 | 533.330ns | 00006.4594 7097 |

125μs {

| Tarnsation | H | IN | ADDR | ENDP | T | Data | Time | Time Stamp |
|---|---|---|---|---|---|---|---|---|
| 11 | S | 0x96 | 1 | 1 | 2 | 960 bytes | 17.333μs | 00006.4594 7129 |
| Tarnsation | H | IN | ADDR | ENDP | T | Data | Time | Time Stamp |
| 12 | S | 0x96 | 1 | 1 | 1 | 960 bytes | 17.300μs | 00006.4595 0669 |
| Tarnsation | H | IN | ADDR | ENDP | T | Data | Time | Time Stamp |
| 13 | S | 0x96 | 1 | 1 | 0 | 960 bytes | 17.533μs | 00006.4595 1707 |
| Tarnsation | H | IN | ADDR | ENDP | T | Data | Time | Time Stamp |
| 14 | S | 0x96 | 1 | 2 | 2 | 960 bytes | 17.233μs | 00006.4595 2759 |
| Tarnsation | H | IN | ADDR | ENDP | T | Data | Time | Time Stamp |
| 15 | S | 0x96 | 1 | 2 | 1 | 960 bytes | 17.333μs | 00006.4595 3793 |
| Tarnsation | H | IN | ADDR | ENDP | T | Data | Time | Time Stamp |
| 16 | S | 0x96 | 1 | 2 | 0 | 960 bytes | 37.733μs | 00006.4595 4833 |

| Packet | Dir | H | SOF | Frame# | CRC5 | Pkt Len | Time | Time Stamp |
|---|---|---|---|---|---|---|---|---|
| 36 | → | S | 0xA5 | 1972.? | 0x14 | 14 | 533.330ns | 00006.4593 7097 |

METHOD AND SYSTEM FOR A UNIVERSAL SERIAL BUS IMAGE CAPTURING WITH TWO ISOCHRONOUS TRANSFERS

CROSS REFERENCE TO RELATED APPLICATION

This application claims the benefits of the Taiwan Patent Application Serial Number 099116667, filed on May 25, 2010, the subject matter of which is incorporated herein by reference.

This application claims the benefit of filing date of U.S. Provisional Application Ser. No. 61/282,948, entitled "Dual-ISO USB Video System and Method" filed Apr. 28, 2010 under 35 USC & 119(e)(1).

BACKGROUND OF THE INVENTION

1. Field of the Invention

The present invention relates to the technical field of universal serial bus (USB) and, more particularly, to a method and system for universal serial bus (USB) image capturing with two isochronous transfers.

2. Description of Related Art

With the advance of image extraction and processing, the image capturing device is evolved from a traditional camera into a digital camera. The digital cameras are in widespread use nowadays. Image obtained by a digital camera is stored as a digital image file in, for example, an embedded memory medium or removable memory card. The resolution of a digital camera is much higher than that of a viewfinder, so that a USB is typically used to transfer digital image files to a computer for image processing by the corresponding software of the computer.

The USB transfers can be divided into: (1) control transfer; (2) interrupt transfer; (3) bulk transfer; and (4) isochronous transfer, wherein the isochronous transfer is employed to proceed data transfer without considering data errors. Therefore, digital cameras generally use the isochronous transfer for increasing the transfer rate to a computer.

Digital cameras typical use a single isochronous transfer. In this case, the driver of a computer activates a transmission channel for a video stream to call a function, named "USB-CAMD_SelectConfiguration", thereby obtaining the required USB bandwidth and associated encoder/decoder. In addition, the driver calls a function, named "SBCAMD_PrepareChannel", to activate an image transmission channel for the video stream of a digital camera. Furthermore, the driver calls a function, named "USBCAMD_ReadChannel)", to read the frames from the image transmission channel.

Figure 1:
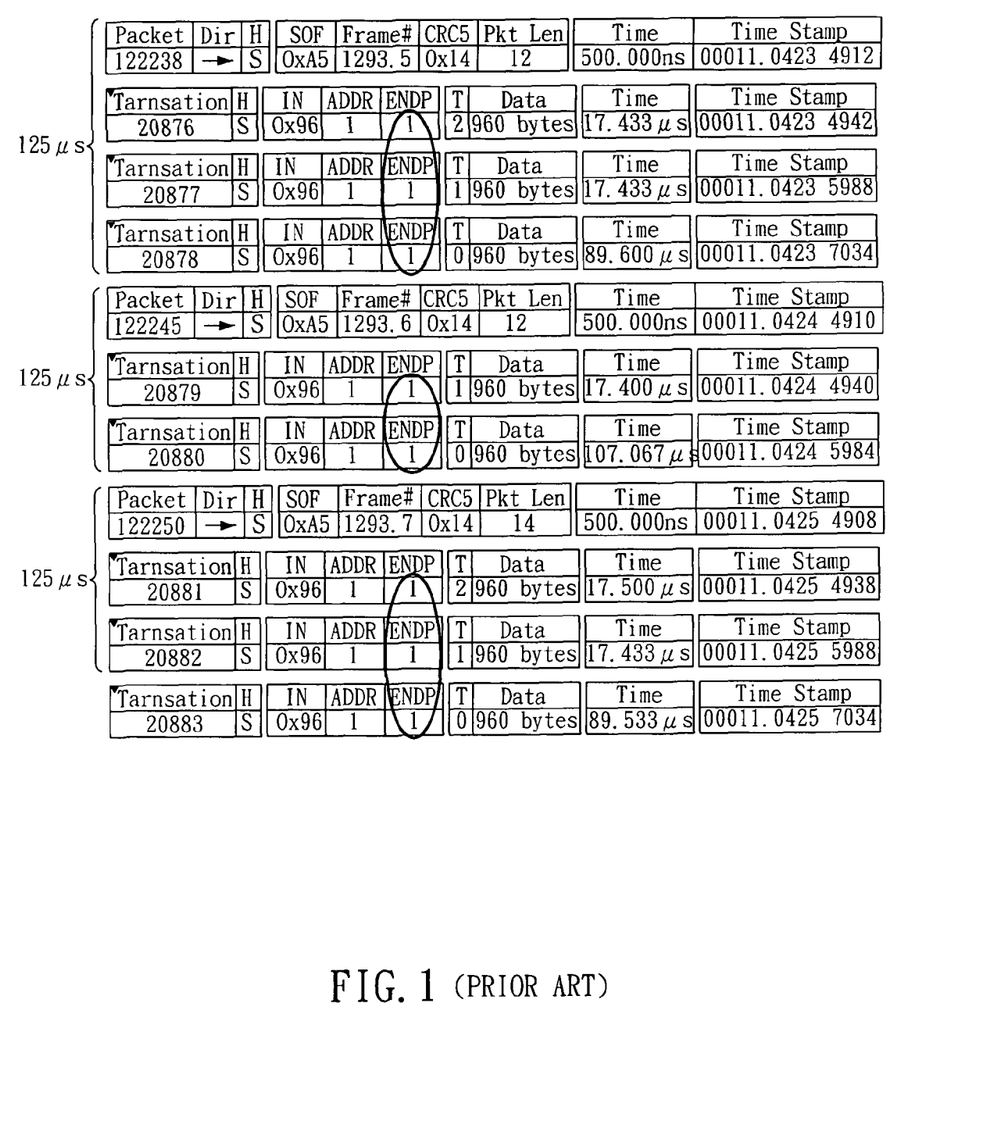
FIG. 1 is a schematic diagram of an isochronous transfer on a USB.

FIG. 1 is a schematic diagram of an isochronous transfer on a USB, wherein the measures on the USB are obtained by using a USB analyzer.

As shown in FIG. 1, a transfer of packet 122238 includes transactions 20876, 20877, and 20878, a transfer of packet 122245 includes transactions 20879 and 20880, and a transfer of packet 122250 includes transactions 20881, 20882, and 20883. Either one of the packets is output at the first endpoint of a typical digital camera. Since the endpoint is unique in typical digital cameras, the USB in FIG. 1 supports only one endpoint.

Figure 2:
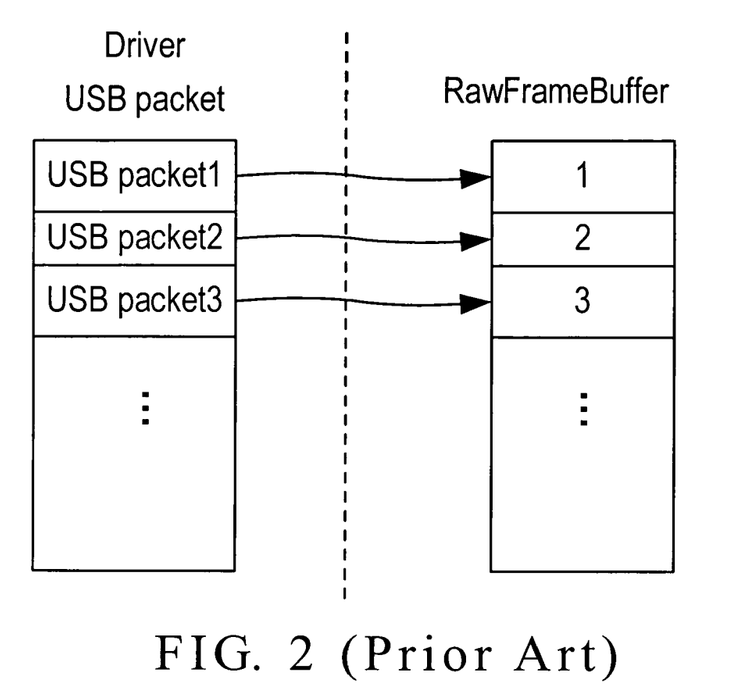
FIG. 2 is a schematic diagram of data processing of a typical driver.

FIG. 2 is a schematic diagram of data processing of a typical driver. The driver sequentially combines data of the transactions 20876, 20877, and 20878 into packet 1, data of the transactions 20879 and 20880 into packet 2, and data of the transactions 20881, 20882, and 20883 into packet 3. The subsequent steps are the same, and thus no further detail is described. When a complete frame of data is received, the driver sequentially copies packets 1, 2, and 3 to a buffer RawFrameBuffer.

Since the typical digital camera has only one endpoint and the USB supports only one endpoint in USB Video Class, the driver calls the function "USBCAMD_SelectConfiguration" to thereby obtain a bandwidth of 24 MB/sec. only. However, the resolution of digital camera is getting higher, resulting in that the single endpoint and corresponding bandwidth cannot quickly transfer images obtained by a digital camera to a host.

Therefore, it is desirable to provide an improved method and system for universal serial bus (USB) camera with two isochronous transfers to mitigate and/or obviate the aforementioned problems.

SUMMARY OF THE INVENTION

The object of the present invention is to provide a method and system for universal serial bus (USB) image capturing with two isochronous transfers, which can increase the transfer rate and quickly transfer images obtained by the USB camera to a host.

According to one aspect of the invention, a method for universal serial bus (USB) image capturing with two isochronous transfers is provided, which is applied for data transfer between a USB image capturing device and a host. The USB image capturing device has a first endpoint and a second endpoint for transferring a video stream obtained by the USB image capturing device. The host has a USB and a driver for receiving the video stream through the USB. The method comprises the steps of: (A) the driver reading the video stream of the USB image capturing device; (B) the driver creating a read extension data structure respectively for the endpoints so as to process packets of the endpoints; (C) the driver dispatching the packets received through the USB; (D) the driver managing and copying data of the packets into a first buffer and a second buffer, respectively; (E) the driver determining whether a first end frame flag in a packet of the first endpoint and a second end frame flag in a packet of the second endpoint are set or not; and (F) the driver combining data of the first and the second buffers when the first and second end frame flags are set, thereby generating a frame to the host.

According to another aspect of the invention, a system for universal serial bus (USB) image capturing with two isochronous transfers is provided, which includes a USB image capturing device having a first endpoint and a second endpoint for transferring a video stream at the first and the second endpoints; and a host having a USB and a driver for receiving the video stream transmitted by the USB image capturing device through the USB. The driver reads the video stream of the USB image capturing device, creates a read extension data structure respectively for the endpoints so as to process packets of the endpoints, manages and dispatches the packets received through the USB, and copies data of the packets into a first buffer and a second buffer, respectively. The driver determines whether a first end frame flag in a packet of the first endpoint and a second end frame flag in a packet of the second endpoint are set or not, and combines data of the first and the second buffers into a frame to the host when the first and second end frame flags are set.

Other objects, advantages, and novel features of the invention will become more apparent from the following detailed description when taken in conjunction with the accompanying drawings.

DETAILED DESCRIPTION OF THE PREFERRED EMBODIMENT

Figure 3:
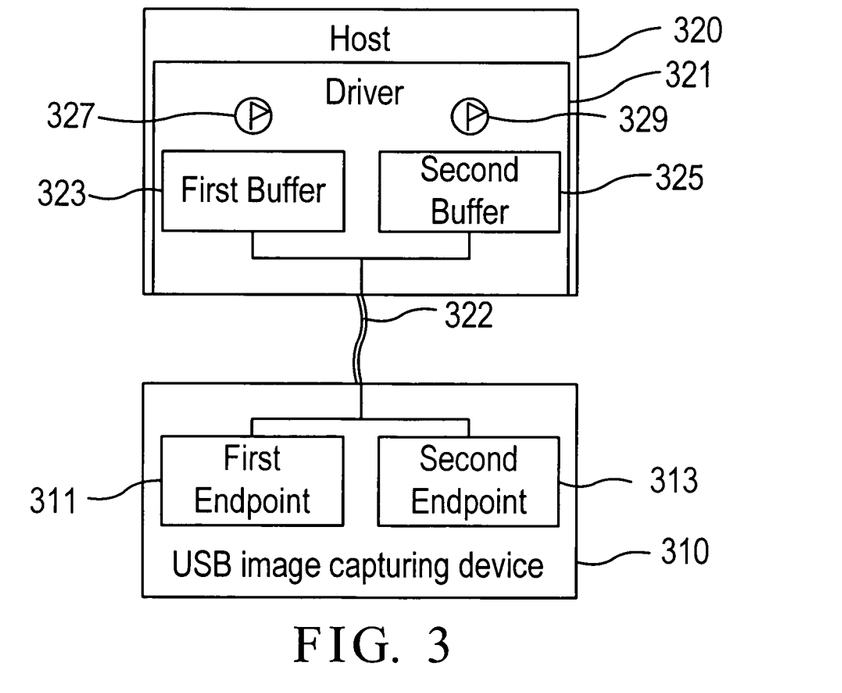
FIG. 3 is a schematic diagram of a system for universal serial bus (USB) image capturing with two isochronous transfers according to an embodiment of the invention.

The invention provides a method and system for universal serial bus (USB) image capturing with two isochronous transfers. With reference to FIG. 3, there is shown a schematic diagram of the system for universal serial bus (USB) image capturing with two isochronous transfers according to an embodiment of the invention. As shown, the system includes a USB image capturing device 310 and a host 320. The USB image capturing device 310 is connected to the host 320 through a USB 322. In this embodiment, the USB image capturing device 310 is preferably a USB camera.

The USB image capturing device 310 has a first endpoint 311 and a second endpoint 313. By using the two endpoints 311 and 313, a video stream obtained by the USB image capturing device 310 can be transferred through the USB 322.

The host 320 with a driver 321 receives the video stream transmitted by the USB image capturing device 310 and transfers data to the USB image capturing device 310 through the USB.

The driver 321 reads the video stream of the USB image capturing device 310 and creates a read extension data structure respectively for the endpoints 311 and 313 in order to process the packets of the endpoints 311 and 313 of the USB image capturing device 310. Also, the driver 321 manages and dispatches the packets received through the USB 322, and copies data of the packets into the first buffer 311 and the second buffer 313, respectively. The driver 321 determines whether an end frame flag 327 in a packet of the first endpoint is set or not and whether an end frame flag 329 in a packet of the second endpoint is set or not. The driver 321 combines data of the first and the second buffers 311 and 313 into a frame when the flags 327 and 329 are set, and sends the frame to the host 320.

Figure 4:
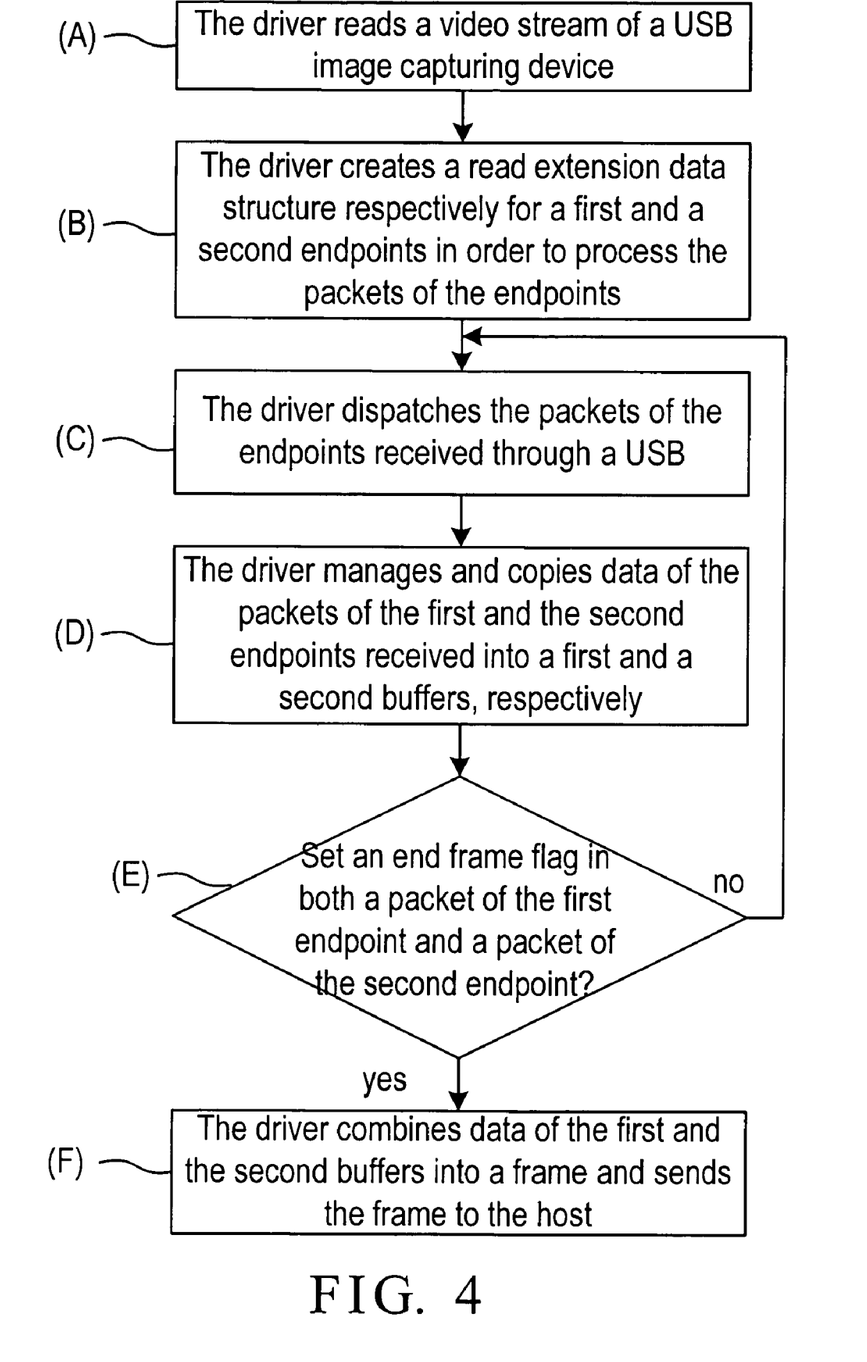
FIG. 4 is a flowchart of a method for universal serial bus (USB) image capturing with two isochronous transfers according to an embodiment of the invention.

FIG. 4 is a flowchart of a method for the universal serial bus (USB) image capturing with two isochronous transfers according to an embodiment of the invention. The method is applied for data transfer between the USB image capturing device 310 and the host 320. As shown in FIGS. 3 and 4, the USB image capturing device 310 has the first endpoint 311 and the second endpoint 313 for transferring a video stream through the USB 322 by using the two endpoints 311 and 313.

The host 320 with the driver 321 receives the video stream transmitted by the USB image capturing device 310 and transfers data to the USB image capturing device 310 through the USB 322. In step (A), the driver 321 reads the video stream of the USB image capturing device 310. In step (A), the driver 321 uses a function "USBCAMD_ReadChannel" to read the video stream of the USB image capturing device 310. The data transfer between the USB image capturing device 310 and the host 320 is operated in a manner of isochronous transfer.

In step (B), the driver 321 creates a read extension data structure respectively for the endpoints 311 and 313 in order to process the packets of the endpoints 311 and 313 of the USB image capturing device 310. In step (B), the driver 321 creates the read extension data structure, named "USBCAMD_ReadExtension", for processing the packets of the endpoints 311 and 313.

Figure 5:
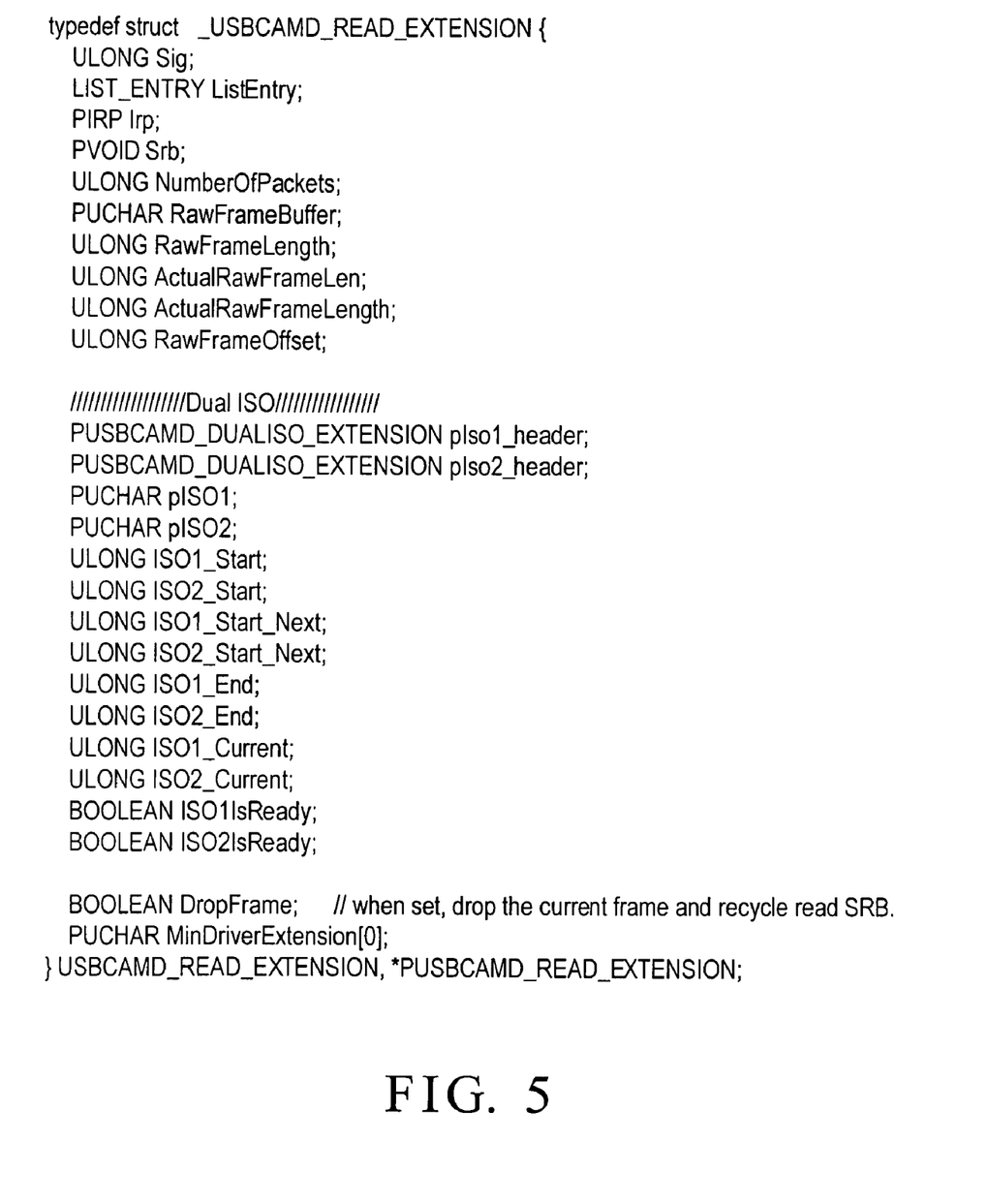
FIG. 5 is a schematic graph of a data structure of "USB-CAMD_ReadExtension" according to an embodiment of the invention.
Figure 6:
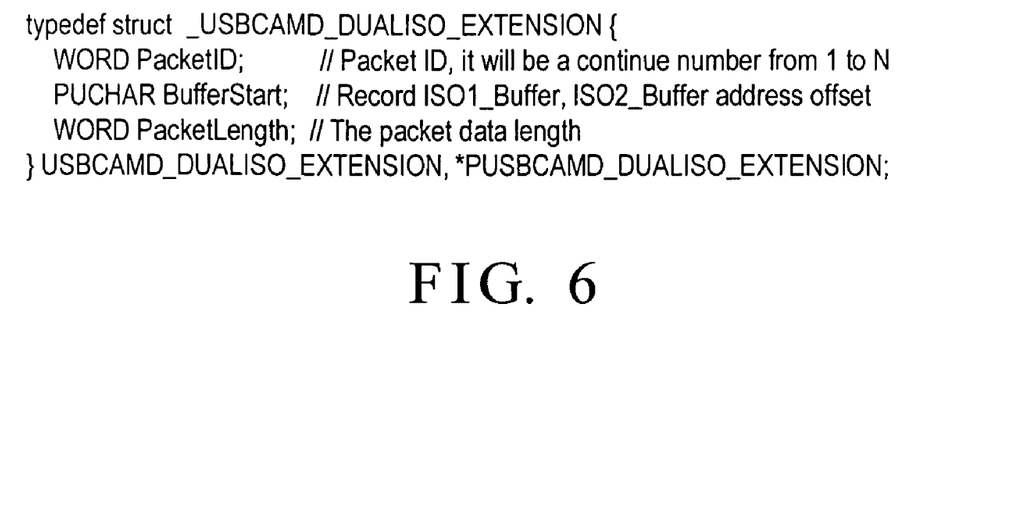
FIG. 6 is a schematic graph of a data structure of "USB-CAMD_DUALISO_EXTENSION" according to an embodiment of the invention.
Figure 7:
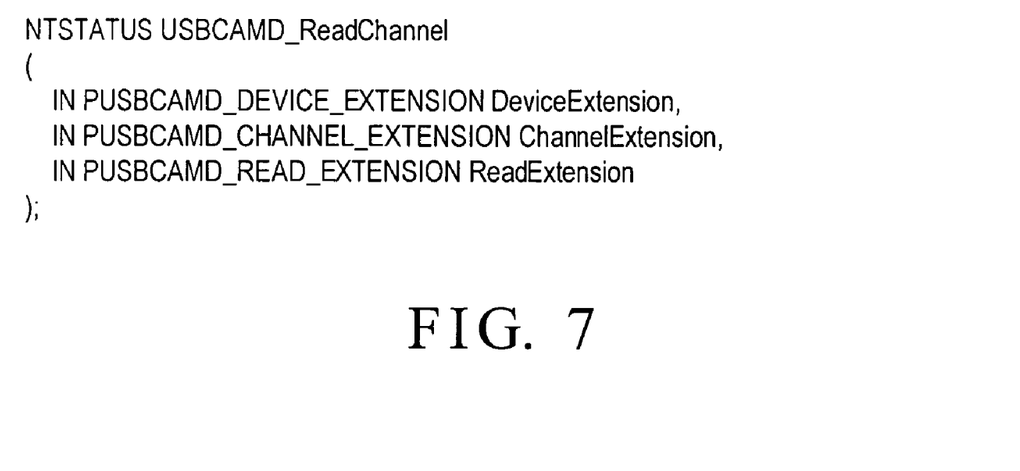
FIG. 7 is a schematic graph of a data structure of "USB-CAMD_ReadChannel" according to an embodiment of the invention.

FIG. 5 is a schematic graph of the data structure "USBCAMD_ReadExtension" according to an embodiment of the invention. FIG. 6 is a schematic graph of the data structure of USBCAMD_DUALISO_EXTENSION according to an embodiment of the invention. FIG. 7 is a schematic graph of the data structure of USBCAMD_ReadChannel according to an embodiment of the invention.

In the figures, according to pISO1, pISO2, ISO1_Start, ISO2_Start, ..., the first buffer 323 and the second buffer 325 are processed. It is well known to those skilled in the art that the driver 321 performs corresponding operations on the packets of the endpoints according to the data structures of the invention, and thus a detailed description is deemed unnecessary.

In step (C), the driver 321 dispatches the packets received through the USB 322.

In step (D), the driver 321 manages the packets of the endpoints 311 and 313, and copies data of the packets into a first buffer and a second buffer, respectively.

In step (E), the driver 321 determines whether an end frame flag 327 in a packet of the first endpoint 311 is set or not and whether an end frame flag 329 in a packet of the second endpoint 313 is set or not.

In step (F), when the driver 321 determines that both the flags 327 and 329 are set, the data of the first and the second buffers 323 and 325 are combined into a frame by the driver 321 for sending the frame to the host 320.

When the driver 321 in step (E) determines that the flag 327 or 329 is not set, the driver 321 executes step (C).

Figure 8:
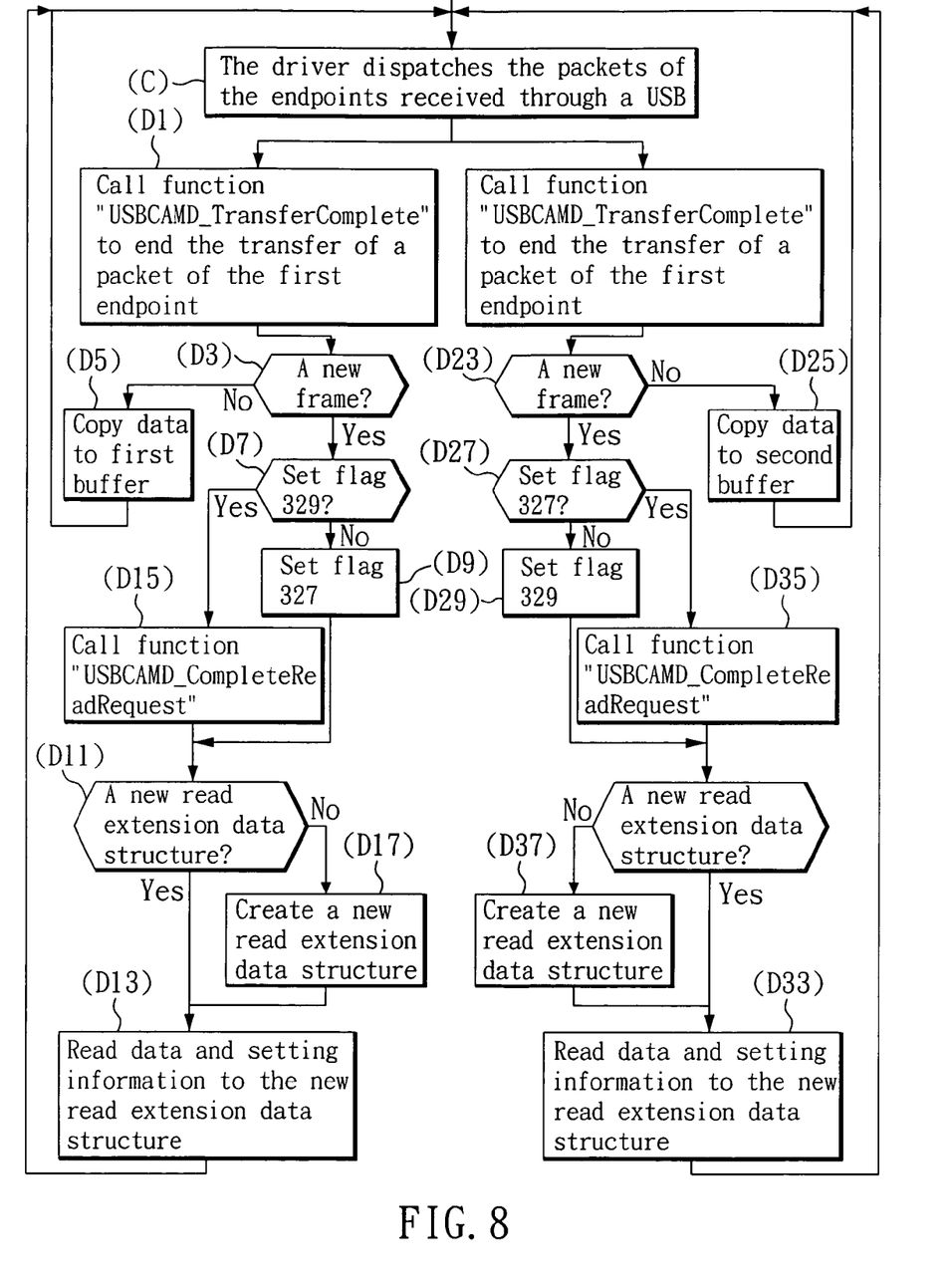
FIG. 8 is a detailed flowchart of the step (D) in FIG. 4 according to an embodiment of the invention.

FIG. 8 is a detailed flowchart of the step (D) in FIG. 4 according to an embodiment of the invention. As shown in FIG. 8, step (D1) calls a function "USBCAMD_TransferComplete" to end the transfer of a packet of the first endpoint 311. The driver 321 sends a data request to the first endpoint 311, and jumps to another thread where a different task is assigned and executed. After the first endpoint 311 completely receives the data requested, the operating system calls the function "USBCAMD_TransferComplete" and returns to the function "USBCAMD_TransferComplete" to process the data just received.

Step (D3) determines whether the packet in step (D1) belongs to a new frame or not. When it is determined in step (D3) that the packet does not belong to a new frame, step (D5) copies data of the packet of the first endpoint 311 to the first buffer 323, sets fields associated with the data structure "USBCAMD_ReadExtension", and returns to step (C).

When it is determined in step (D3) that the packet belongs to a new frame, step (D7) further determines whether an end frame flag 329 in a packet of the second endpoint 313 is set or not.

When it is determined in step (D7) that the end frame flag 329 in the packet of the second endpoint 313 is not set, step (D9) sets the end frame flag 327 in the packet of the first endpoint 311 and executes step (D11).

When it is determined in step (D7) that the end frame flag 329 in the packet of the second endpoint 313 is set, step (D15) calls a function "USBCAMD_CompleteReadRequest" and executes step (D11).

Step (D11) determines whether there is a new read extension data structure for the first endpoint 311 or not.

When it is determined in step (D11) that there is a new read extension data structure for the first endpoint 311, step (D13) reads data and setting information to the new read extension data structure and returns to step (C). When it is determined in step (D11) that there is no new read extension data structure for the first endpoint 311, step (D17) creates one and returns to step (D13).

Step (D21) calls a function "USBCAMD_TransferComplete" to end the transfer of a packet of the second endpoint 313.

Step (D23) determines whether the packet in step (D21) belongs to a new frame or not. When it is determined in step (D23) that the packet does not belong to a new frame, step (D25) copies data of the packet of the second endpoint 313 to the second buffer 325, sets fields associated with the data structure "USBCAMD_ReadExtension", and returns to step (C).

When it is determined in step (D23) that the packet belongs to a new frame, step (D27) further determines whether the end frame flag 327 in a packet of the first endpoint 311 is set or not.

When it is determined in step (D27) that the end frame flag 327 in the packet of the first endpoint 311 is not set, step (D29) sets the end frame flag 329 in the packet of the second endpoint 313 and executes step (D31).

When it is determined in step (D27) that the end frame flag 327 in the packet of the first endpoint 313 is set, step (D35) calls the function "USBCAMD_CompleteReadRequest" and executes step (D31).

Step (D31) determines whether there is a new read extension data structure for the second endpoint 313 or not.

When it is determined in step (D31) that there is a new read extension data structure for the second endpoint 313, step (D33) reads data and setting information to the new read extension data structure and returns to step (C). When it is determined in step (D31) that there is no new read extension data structure for the second endpoint 313, step (D37) creates one and returns to step (D33).

When it is determined that the packet in step (D3) belongs to a new frame and the end frame flag 329 in the packet of the second endpoint in step (D7) is set, it indicates that all packets of the endpoints 311 and 313 are transferred, and in this case step (D15) calls the function "USBCAMD_CompleteReadRequest" to complete the frame data transfer, which is similar to the process executed in step (D23) and thus a detailed description is deemed unnecessary.

Figure 9:
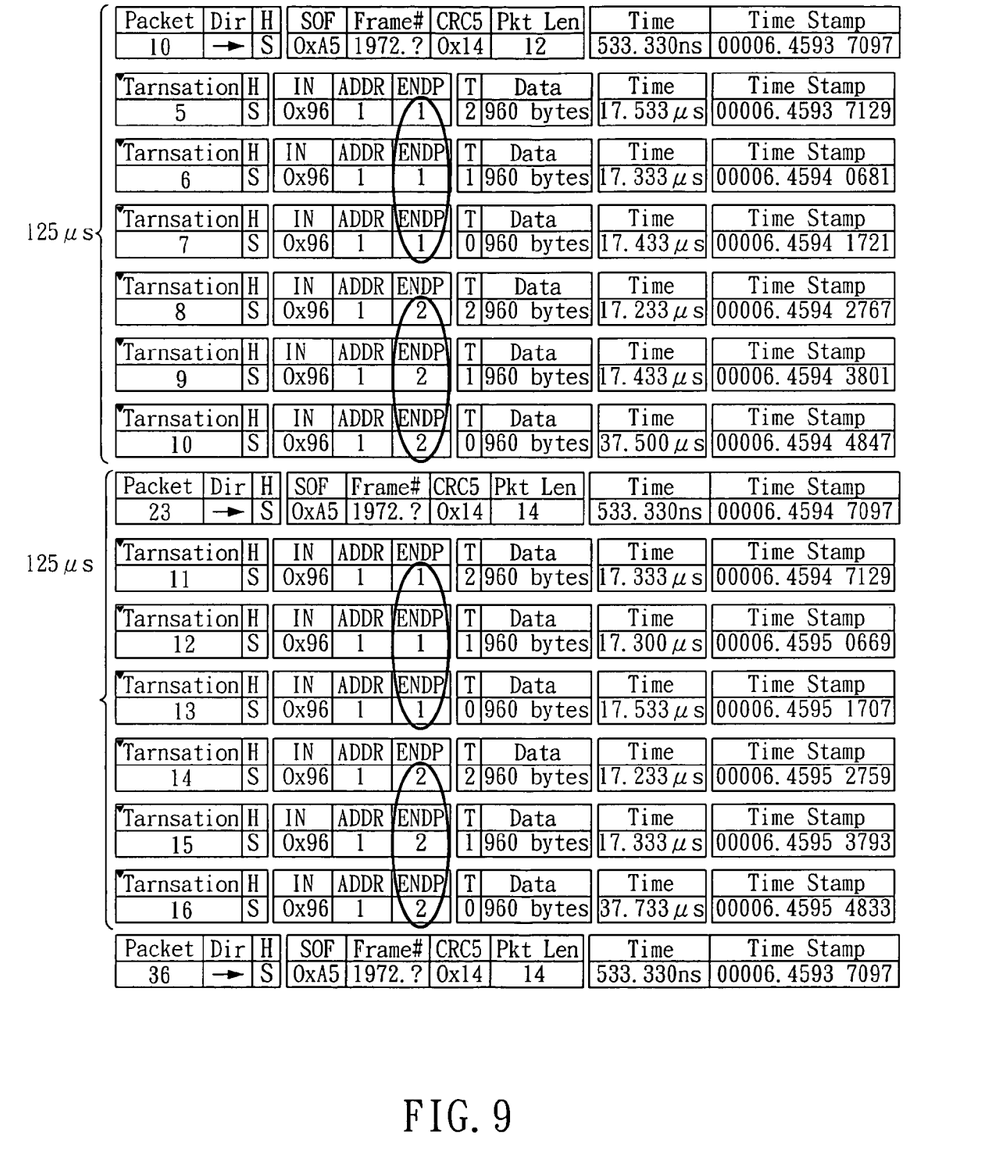
FIG. 9 is a schematic diagram of two isochronous transfers on a USB according to an embodiment of the invention.

FIG. 9 is a schematic diagram of two isochronous transfers on a USB according to an embodiment of the invention, wherein the measures on the USB are obtained by using a USB analyzer. As shown in FIG. 9, a transfer of packet 10 includes transactions 5-10, and a transfer of packet 23 includes transactions 11-16. The transactions 5-7, and 11-13 are originated from the first endpoint 311 of the USB image capturing device 310, and the transactions 8-10, and 14-16 are originated from the second endpoint 313 of the USB image capturing device 310.

Figure 10:
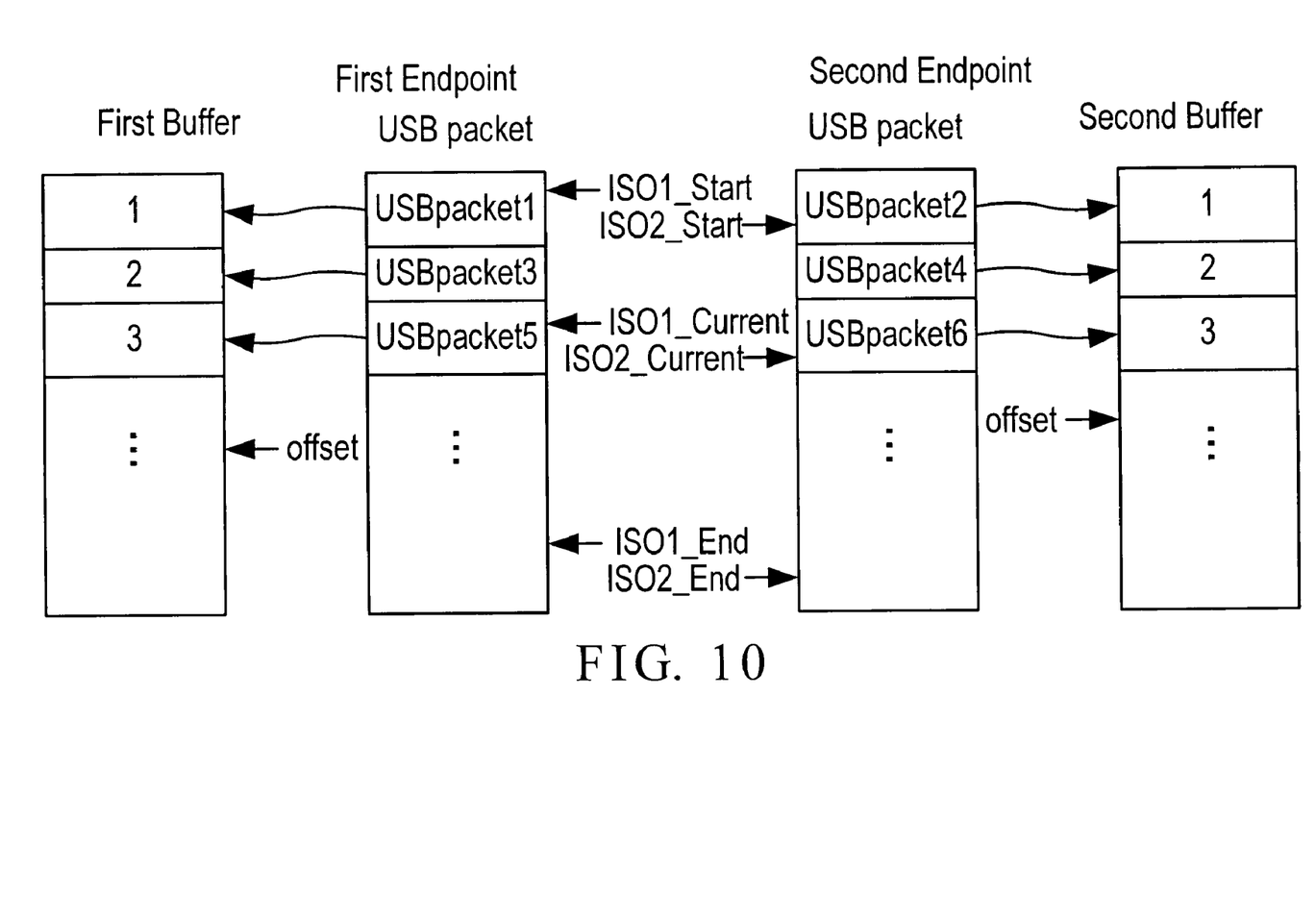
FIG. 10 is a schematic diagram of data processing of a driver according to an embodiment of the invention.

FIG. 10 is a schematic diagram of data processing of the driver 321 according to an embodiment of the invention. The driver 321 sequentially combines data of the transactions 5-7 into packet 1, and data of the transactions 8-10 into packet 2. The subsequent steps are the same, and thus no more detail is described.

Therefore, it is known that the prior art has only one endpoint and provides a bandwidth of 24 MB/sec on transmission at most. As shown in FIG. 1, in one transfer time (125 µsec), three transactions can be provided at most. By contrast, the USB image capturing device 310 of the invention has multiple endpoints (in this embodiment, first and second endpoints 311 and 313), so that a bandwidth of 48 MB/sec on transmission, which is double of the prior art, can be obtained in the USB configuration. It can be seen from FIG. 9 that six transactions are provided in one transfer time (125 µsec), i.e., three transactions from the first endpoint 311 and the other three from the second endpoint 313.

In addition, the USB driver of a traditional digital camera can support one endpoint only. Even the hardware is expanded to have two endpoints, the digital camera will be unable to operate normally for the two endpoints due to the limit on the USB driver in the prior art.

In view of the foregoing, it is known that the invention provides a method and system for a universal serial bus (USB) image capturing device with two isochronous transfers, which allows a USB digital image capturing device to have two endpoints and modifies the driver to increase its transfer rate, thereby transferring images obtained by the image capturing device to a host quickly.

Although the present invention has been explained in relation to its preferred embodiment, it is to be understood that many other possible modifications and variations can be made without departing from the spirit and scope of the invention as hereinafter claimed.

What is claimed is:

1. A method for USB image capturing with two isochronous transfers, which is applied for data transfer between a USB image capturing device and a host, the USB image capturing device having a first endpoint and a second endpoint for transferring a video stream obtained by the USB image capturing device, the host having a USB and a driver for receiving the video stream through the USB, the method comprising the steps of:
   (A) the driver using a function "USBCAMD_ReadChannel" to read the video stream of the USB image capturing device;
   (B) the driver creating a read extension data structure of "USBCAMD ReadExtension" to process packets of the first and the second endpoints of the USB image capturing device respectively;
   (C) the driver dispatching the packets received through the USB;
   (D) the driver managing and copying data of the packets into a first buffer and a second buffer, respectively;
   (E) the driver determining whether a first end frame flag in a packet of the first endpoint is set and a second end frame flag in a packet of the second endpoint is are set or not; and
   (F) the driver combining data of the first and the second buffers when the first and second end frame flags are set, thereby generating a frame to the host.

2. The method as claimed in claim 1, wherein the driver executes step (C) when it is determined in step (E) that either the first end frame flag or the second end frame flag is not set.

3. The method as claimed in claim 2, wherein the data transfer between the USB image capturing device and the host is operated in a manner of isochronous transfer.

4. The method as claimed in claim 3, wherein step (D) further comprises the steps of:
- (D1) calling a function "USBCAMD_TransferComplete" to end a transfer of a packet of the first endpoint;
- (D3) determining whether the packet in step (D1) belongs to a new frame or not; and
- (D5) copying the packet in step (D1) to the first buffer when it is determined in step (D3) that the packet does not belong to a new frame, and returning to step (C).

5. The method as claimed in claim 4, wherein step (D) further comprises the steps of:
- (D7) determining whether the second flag in the packet of the second endpoint is set or not when it is determined in step (D3) that the packet belongs to a new frame;
- (D9) setting the first flag in the packet in step (D1) when it is determined in step (D7) that the second flag in the packet of the second endpoint is not set;
- (D11) determining whether there is a new read extension data structure for the first endpoint; and
- (D13) reading data and setting information to the new read extension data structure when it is determined in step (D11) that there is a new read extension data structure for the first endpoint, and returning to step (C).

6. The method as claimed in claim 5, wherein step (D) further comprises the steps of:
- (D15) calling a function "USBCAMD_CompleteReadRequest" when it is determined in step (D7) that the second end frame flag in the packet of the second endpoint is set, and executing step (D11).

7. The method as claimed in claim 5, wherein step (D) further comprises the step of:
- (D17) creating one new read extension data structure when it is determined in step (D11) that there is no new read extension data structure for the first endpoint, and returning to step (D13).

8. The method as claimed in claim 1, wherein step (D) further comprises the steps of:
- (D21) calling a function "USBCAMD_TransferComplete" to end a transfer of a packet of the second endpoint;
- (D23) determining whether the packet in step (D21) belongs to a new frame; and
- (D25) copying the packet in step (21) to the second buffer when it is determined in step (D23) that the packet does not belong to a new frame, and returning to step (C).

9. The method as claimed in claim 8, wherein step (D) further comprises the steps of:
- (D27) determining whether the first flag in the packet of the first endpoint is set or not when it is determined in step (D23) that the packet in step (D21) belongs to a new frame;
- (D29) setting the second end frame flag in the packet in step (D21) when it is determined in step (D27) that the first flag in the packet of the first endpoint is not set, and executing step (D31);
- (D31) determining whether there is a new read extension data structure for the second endpoint or not; and
- (D33) reading data and setting information to the new read extension data structure when it is determined in step (D31) that there is a new read extension data structure for the second endpoint, and returning to step (C).

10. The method as claimed in claim 9, wherein step (D) further comprises the step of:
- (D35) calling a function "USBCAMD_CompleteReadRequest" when it is determined in step (D27) that the first flag in the packet of the first endpoint is set, and executing step (D31).

11. The method as claimed in claim 10, wherein step (D) further comprises the step of:
- (D37) creating one new read extension data structure when it is determined in step (D31) that there is no new read extension data structure for the second endpoint, and returning to step (D33).

12. A system for USB image capturing with two isochronous transfers, comprising:
- a USB image capturing device having a first endpoint and a second endpoint for transferring a video stream at the first and the second endpoints; and
- a host having a USB and a driver for receiving the video stream transmitted by the USB image capturing device through the USB;
- wherein data transfer between the USB image capturing device and the host is operated in a manner of isochronous transfer, and wherein the driver uses a function "USBCAMD_ReadChannel" to read the video stream of the USB image capturing device, creates a read extension data structure of "USBCAMD_ReadExtension" to process packets of the first and the second endpoints of the USB image capturing device respectively for the endpoints so as to process packets of the endpoints, manages and dispatches the packets received through the USB, and copies data of the packets into a first buffer and a second buffer, respectively; and the driver determines whether a first end frame flag in a packet of the first endpoint is set and a second end frame flag in a packet of the second endpoint is set or not, and combines data of the first and the second buffers into a frame to the host when the first and second end frame flags are set.

* * * * *